Feb. 25, 1964  F. R. JACKSON ETAL  3,121,942
DEVICE FOR AXIALLY COMPRESSING HELICALLY CONVOLUTED CONDUITS
Filed May 12, 1961  2 Sheets-Sheet 1
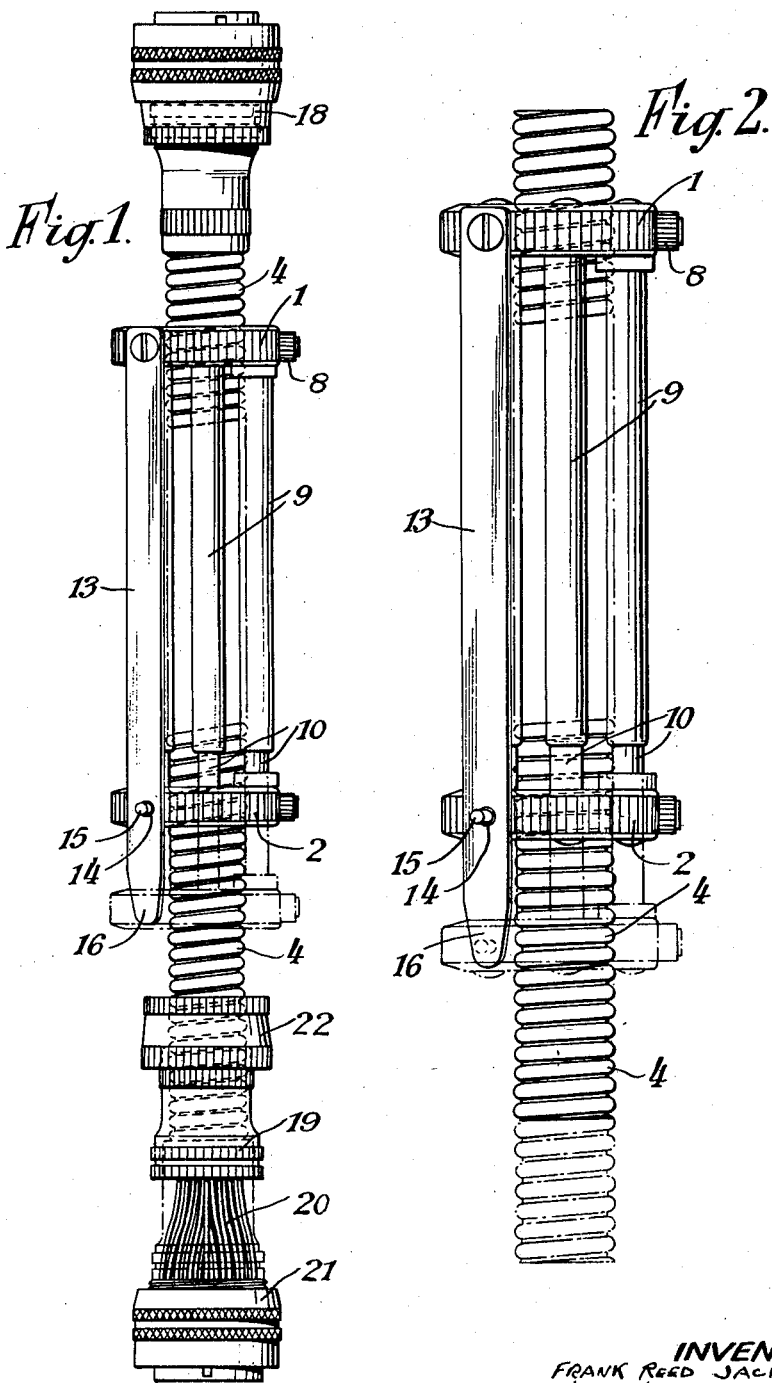
INVENTORS
FRANK REED JACKSON
JOHN WILLIAM WILSON
BY Dean, Fairbank & Hirsch
ATTORNEY Feb. 25, 1964 F. R. JACKSON ETAL 3,121,942
DEVICE FOR AXIALLY COMPRESSING HELICALLY CONVOLUTED CONDUITS
Filed May 12, 1961 2 Sheets-Sheet 2

INVENTOR
FRANK REED JACKSON
JOHN WILLIAM WILSON
BY Dean, Fairbank & Hirsch
ATTORNEY

United States Patent Office 3,121,942
Patented Feb. 25, 1964

3,121,942
DEVICE FOR AXIALLY COMPRESSING HELICALLY CONVOLUTED CONDUITS
Frank Reed Jackson, Burnham, and John William Wilson, Slough, England, assignors to Superflexit Limited, Slough, England
Filed May 12, 1961, Ser. No. 109,593
Claims priority, application Great Britain Aug. 17, 1960
2 Claims. (Cl. 29—270)

The device forming the subject of the present invention has been designed for use in connection with helically convoluted conduits carrying end fittings, which conduits are intended to enclose bunched electrical wires, the extremities of which are crimped or soldered to soldering tags provided on multiple pin plugs or sockets.

It will be appreciated that it is often necessary to have access to the various soldered connections at some time or another after the various connections have been made and unless some type of retractable sleeve is used, it is necessary to draw back the end of the conduit, which necessitates compressing the conduit in an axial direction. The difficulty, of course, is increased where the conduit is of comparatively short length and carries an end fitting at both ends.

Although the use of retractable sleeves for this purpose is quite satisfactory, in some cases it is necessary for the end fittings to be of quite small dimensions, which precludes the use of a comparatively lengthy sleeve, and the chief object of the present invention is to evolve means whereby even a comparatively short length conduit can be compressed axially a sufficient amount to enable one or more crimped or soldered connections to be inspected or remade when the conduiting and its associated wiring has been assembled together with the multiple pin or socket type plugs.

A device for the purpose specified and in accordance with the invention comprises a pair of end plates adapted to fit around the conduit at spaced points and internally threaded to engage the helical convolutions of the conduit, the end plates being telescopically connected together whereby the two end plates can be moved towards one another to compress the part of the conduit lying between the end plates, the clamp being so formed as to restrain the compressed conduit from lateral deflection or kinking.

Although it is within the scope of the invention to employ screw or other means to draw the clamp parts towards one another it will generally be sufficient to apply normal hand pressure.

Referring to the accompanying drawings:

FIGURE 1 is a plan view of the two part clamp applied to a length of helically convoluted conduit carrying two end fittings;

FIGURE 2 is a similar view on an enlarged scale showing more clearly the method of operation;

Figure 3:
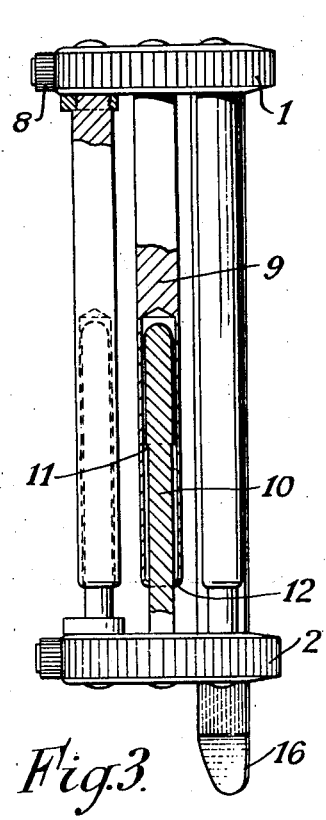
FIGURE 3 is a view of the two part clamp partly in section.

The device shown in the drawings includes two end plates 1 and 2 which are preferably of arcuate or part circular shape, each end plate being internally threaded at 3 to engage the helical convolutions of the helically convoluted conduit 4 which is to be compressed. The parts of each end plate are hinged together by means of a connecting link 5 one part being provided with a projection 6 which is engaged by a notch 7 in a retaining catch member 8 pivotally associated with the opposite part of the end plate.

The end plates 1 and 2 are connected together by tubular members 9 and rods 10 which telescope one within the other and maintain the end plates in parallel relationship whilst permitting the end plates to be moved towards or away from each other through a limited range of movement. Each rod is formed with an annular shoulder 11 which is engageable with the peened over edge 12 of its interengaging tubular member for the purpose of maintaining connection between the parts.

Figure 4:
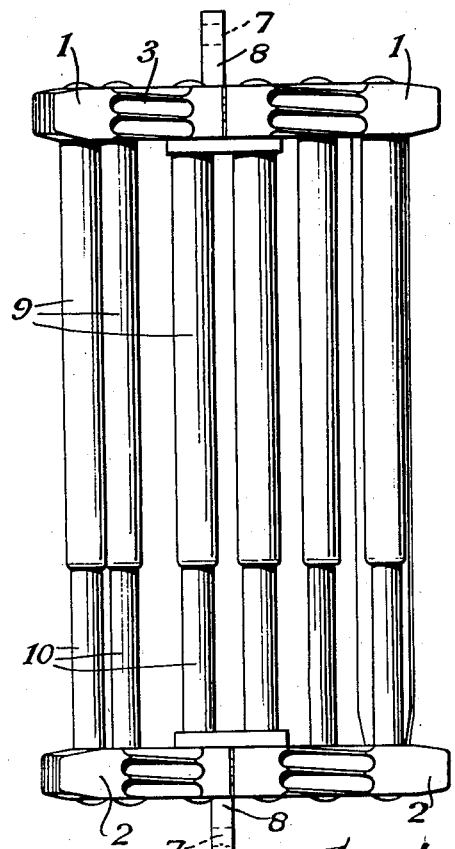
FIGURE 4 is a plan of the clamp in its open position.
Figure 5:
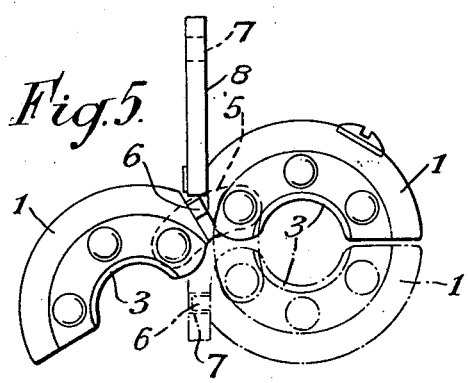
FIGURE 5 is an end elevation.

The clamping device when opened into the position shown in FIGURE 4 can be placed around the conduit so that the device assumes the position shown in FIGURE 2. The catch members 8 are then operated so that the notches 7 engage the projections 6, thus maintaining the end plates in a position in which they closely embrace the conduit, the internal threads 3 engaging the helical convolutions. It will be noted that the rods 10 and the tubes 9 lie parallel with and closely around the conduit in order to prevent lateral deflection and/or kinking of the conduit during compression.

The end plates which are in a position in which they are spaced apart to a maximum extent are then forced for example by hand towards one another, thus compressing that part of the conduit lying between the end plates.

To maintain the end plates in the position shown by full lines in FIGURES 1 and 2, end plate 1 carries a blade spring 13 having a hole 14 which automatically engages a pin or projection 15 on end plate 2 when the two end plates have been drawn towards each other to compress the conduit sufficiently, the blade spring thus holding the end plates in their operative position against the inherent resiliency of the conduit. The extremity 16 of the blade spring is preferably inclined upwardly so that the blade spring will automatically ride up the pin 15 until the hole registers with the pin, the inherent resiliency of the blade spring then causing the pin and hole to engage to lock the clamping device in its operative position.

If reference is now made to FIGURE 1, which shows the purpose of the clamping device, it will be seen that the conduit 4 is fitted with two end fittings 18 and 19. The conduit contains a large number of electrical conducting wires 20 which pass through the end fitting 19 and are attached by soldering to soldering tags on a multipin or multi-socket connector 21. It is sometimes desirable to have access to these soldered connections and with the aid of the clamping device the end fitting 19 which is normally connected with part 21 by means of a sleeve nut 22, can, when the sleeve nut 22 is disengaged from the part 21 and moved into the position shown, be drawn away from the member 21 to expose the soldered connections. Any work can then be done on the otherwise inaccessible parts of the fitting, the blade spring being finally disengaged from the pin 15 to allow the conduit to expand and return to its normal length, in which position parts 19, 21 and 22 can be reconnected together.

It will be appreciated therefore that with the aid of the device the various soldered connections may be made accessible at will and that the clamping device will hold the conduit in a compressed state during the resoldering or other operation. In FIGURES 1 and 2 the normal position of the end plate 2 is shown in dotted lines, the operative position of the end plate 2 being indicated by full lines.

Although one particular form of locking device is shown to maintain the end plates in their operative position any other suitable form of lock may be used. For example one of the rodlike members 10 may be formed with a series of ratchet teeth, the teeth of this rodlike member overriding correspondingly shaped teeth on one of the tubular members 9 or on one of the parts of the associated end plate, the arrangement being such that the action of moving the end plates together causes the teeth to override and when the end plates have been moved sufficiently towards one another to prevent return movement, means being provided to enable the teeth to be separated when it is desired to allow the conduit to return to its normal uncompressed state.

It will be appreciated, therefore, that with the aid of the device the various soldered connections may be made accessible at will and the clamp will hold the conduit in a compressed state during the resoldering or other operation.

We claim:

1. A device for maintaining a length of helically convoluted flexible conduit in a state of axial compression and preventing lateral deflection or kinking of the conduit when compressed, comprising a pair of end plates internally threaded to engage the helical convolutions of the conduit at spaced points and movable in opposite directions towards each other to compress that part of the conduit lying between said plates, telescopic means connecting said plates together and maintaining said plates in coaxial parallel relationship, said telescopic means fitting closely around the conduit to prevent lateral deflection or kinking of the conduit when compressed and means for connecting said plates together when the conduit is compressed to maintain the conduit in its compressed condition.

2. A device as claimed in claim 1, wherein the means connecting the plates together with the conduit in its compressed condition comprises a blade spring carried by one plate and formed with a hole near its opposite end for engaging a projection on the other plate.

References Cited in the file of this patent

UNITED STATES PATENTS

| 889,315 | Kenyon | June 2, 1908 |
| 2,501,242 | Smith | Mar. 21, 1950 |

FOREIGN PATENTS

| 32,595 | Switzerland | Nov. 29, 1904 |
| 1,119,300 | France | Apr. 3, 1956 |